(12) United States Patent
Lipchuk et al.

(10) Patent No.: US 10,241,713 B2
(45) Date of Patent: Mar. 26, 2019

(54) SNAPSHOT MANAGEMENT WITH AN EXTERNAL STORAGE SERVICE

(71) Applicant: Red Hat Israel, Ltd., Raanana (IL)

(72) Inventors: Maor Lipchuk, Rishon Letzion (IL); Daniel Erez, Tel-Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 99 days.

(21) Appl. No.: 15/254,436

(22) Filed: Sep. 1, 2016

(65) Prior Publication Data
US 2018/0059953 A1 Mar. 1, 2018

(51) Int. Cl.
*G06F 3/06* (2006.01)
*G06F 9/455* (2018.01)

(52) U.S. Cl.
CPC ............ *G06F 3/065* (2013.01); *G06F 3/0605* (2013.01); *G06F 3/067* (2013.01); *G06F 3/0689* (2013.01); *G06F 2009/45575* (2013.01)

(58) Field of Classification Search
CPC ....... G06F 9/45558; G06F 2009/45583; G06F 3/065; G06F 3/0644; G06F 3/0689; G06F 2009/45562; G06F 17/30233; G06F 17/30327; G06F 17/30961; G06F 9/45533; G06F 9/45545; G06F 3/067; G06F 3/0605; G06F 2009/45575
USPC ......................................................... 711/162
See application file for complete search history.

(56) References Cited

U.S. PATENT DOCUMENTS

| | | | |
|---|---|---|---|
| 7,017,076 B2 | 3/2006 | Ohno et al. | |
| 8,321,377 B2 | 11/2012 | Michael et al. | |
| 8,370,587 B2 | 2/2013 | Miyamoto | |
| 8,533,157 B2 | 9/2013 | Honami et al. | |
| 8,645,659 B1 | 2/2014 | Winokur | |
| 8,719,767 B2* | 5/2014 | Bansod .................... | G06F 8/71 717/101 |
| 9,116,633 B2 | 8/2015 | Sancheti et al. | |
| 2010/0153617 A1* | 6/2010 | Miroshnichenko ..... | G06F 3/061 711/6 |
| 2013/0263119 A1* | 10/2013 | Pissay ................ | G06F 9/45558 718/1 |

(Continued)

OTHER PUBLICATIONS

Cohen, Sean, et al., "The future integration points for oVirt storage: Birds of a feather session," KVM Forum, Oct. 2013, Edinburgh, Scotland, 10 pages.

*Primary Examiner* — Hashem Farrokh
(74) *Attorney, Agent, or Firm* — Withrow & Terranova, PLLC

(57) ABSTRACT

Mechanisms for snapshot management are provided. A request that requests that a first storage entity of type volume entity be generated is sent to an external storage service via an external interface. An entity chain associated with a virtual machine is generated. A first entry contains a first identifier (ID) that identifies the first storage entity, an entity type ID that identifies the first storage entity as a volume entity, and an active storage entity indicator. A first snapshot command is received. A request is sent to the external storage service via the external interface that requests that a second storage entity of type snapshot-volume entity be generated. A second entry is added to the entity chain that contains a second ID that identifies the second storage entity, an entity type ID that identifies the second storage entity as a snapshot-volume entity, and a reference to the first entry.

11 Claims, 7 Drawing Sheets

(56) References Cited

U.S. PATENT DOCUMENTS

2015/0127618 A1* 5/2015 Alberti .............. G06F 17/30088
                                                        707/678
2016/0246628 A1* 8/2016 Litke ................... G06F 9/45558
2018/0089089 A1* 3/2018 Riel .................... G06F 12/0868

* cited by examiner

SNAPSHOT MANAGEMENT WITH AN EXTERNAL STORAGE SERVICE

TECHNICAL FIELD

The examples relate generally to virtualization, and in particular to mechanisms for snapshot management in external storage services.

BACKGROUND

A process executing on a computing device typically modifies data that is stored in persistent storage over time. There are situations where it would be beneficial to restore data to a previous state prior to any such modifications. A snapshot is one such mechanism for doing so. While the precise implementation of a snapshot differs among different storage services, generally a snapshot preserves the state of a unit of storage, such as a volume, at a particular instance in time. If the volume is subsequently modified in a manner that is deemed undesirable, the snapshot can be used to restore the volume to the state at the time of the snapshot.

SUMMARY

The examples include mechanisms for interoperating with external storage services by maintaining an entity chain of information that facilitates the implementation of consistent commands across different storage services, and that keeps track of what storage entities are generated by a storage service in response to commands.

In one example a method for snapshot management is provided. The method includes sending to an external storage service via an external interface, a first request that requests that a first storage entity of type volume entity be generated. The method further includes generating an entity chain associated with a virtual machine, the entity chain comprising a first entry that contains a first identifier (ID) that identifies the first storage entity, an entity type ID that identifies the first storage entity as a volume entity, and an active storage entity indicator that identifies the first storage entity as having a status as an active storage entity. The method further includes receiving a first snapshot command. The method further includes sending a second request to the external storage service via the external interface that requests that a second storage entity of type snapshot-volume entity be generated. The method further includes adding a second entry to the entity chain that contains a second ID that identifies the second storage entity, an entity type ID that identifies the second storage entity as a snapshot-volume entity, and a reference to the first entry.

In another example a computing device is provided. The computing device includes a memory and a processor device coupled to the memory. The processor is to send to an external storage service via an external interface, a first request that requests that a first storage entity of type volume entity be generated. The processor is further to generate an entity chain associated with a virtual machine, the entity chain comprising a first entry that contains a first identifier (ID) that identifies the first storage entity, an entity type ID that identifies the first storage entity as a volume entity, and an active storage entity indicator that identifies the first storage entity as having a status as an active storage entity. The processor is further to receive a first snapshot command. The processor is further to send a second request to the external storage service via the external interface that requests that a second storage entity of type snapshot— volume entity be generated. The processor is further to add a second entry to the entity chain that contains a second ID that identifies the second storage entity, an entity type ID that identifies the second storage entity as a snapshot-volume entity, and a reference to the first entry.

In another example a computer program product for snapshot management is provided. The computer program product is stored on a non-transitory computer-readable storage medium and includes instructions configured to cause a processor device to send to an external storage service via an external interface, a first request that requests that a first storage entity of type volume entity be generated. The instructions further cause the processor device to generate an entity chain associated with a virtual machine, the entity chain comprising a first entry that contains a first identifier (ID) that identifies the first storage entity, an entity type ID that identifies the first storage entity as a volume entity, and an active storage entity indicator that identifies the first storage entity as having a status as an active storage entity. The instructions further cause the processor device to receive a first snapshot command, and send a second request to the external storage service via the external interface that requests that a second storage entity of type snapshot-volume entity be generated. The instructions further cause the processor device to add a second entry to the entity chain that contains a second ID that identifies the second storage entity, an entity type ID that identifies the second storage entity as a snapshot-volume entity, and a reference to the first entry.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
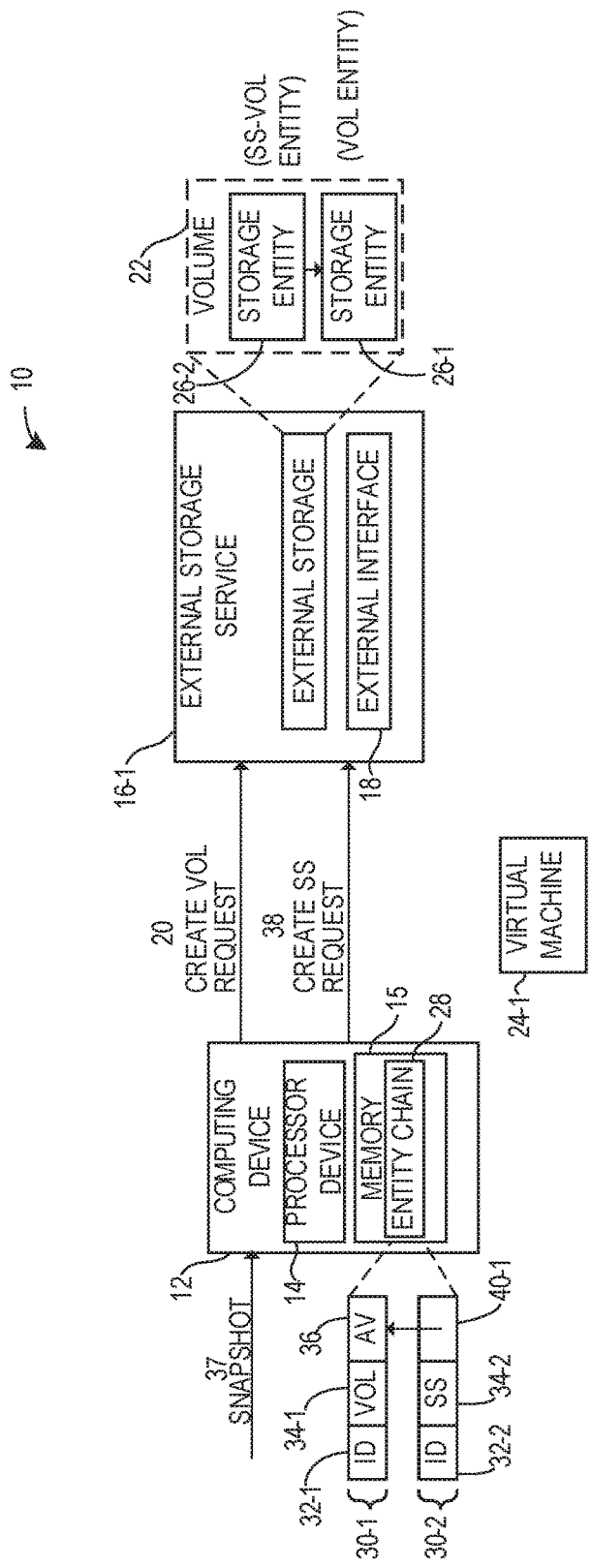
FIG. 1 is a block diagram of an environment in which examples can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first storage entity" and "second storage entity," and does not imply a priority, a type, an importance, or other attribute, unless otherwise stated herein. As used herein and in the claims, the articles "a" and "an" in reference to an element refers to "one or more" of the element unless otherwise explicitly specified.

A process executing on a computing device typically modifies data that is stored in persistent storage over time. There are situations where it would be beneficial to restore data to a previous state prior to any such modifications. A snapshot is one such mechanism for doing so. While the precise implementation of a snapshot differs among different storage services, generally a snapshot preserves the state of a unit of storage, such as a volume, at a particular instance in time. If the volume is subsequently modified in a manner that is deemed undesirable, the snapshot can be used to restore the volume to the state at the time of the snapshot.

Different storage services manage snapshots in different ways. One storage service, for example, may use a QEMU Copy On Write (Qcow), or Qcow2, file format for snapshots. Using Qcow, a snapshot of a volume generates an additional storage space, referred to as the snapshot. The snapshot becomes the "active volume" such that any additional writes to the original volume are made to the snapshot. Multiple snapshots may be taken over time. Other storage systems support snapshots, but the original volume remains the active volume. Determining which storage entity is the active volume is relevant so that a virtual machine is initiated with the correct storage entity after a snapshot is taken.

Some storage services may implement functionality such as an ability to "preview" a snapshot, "commit" a snapshot, and/or "undo" a snapshot. However, not all storage services implement snapshots using the Qcow file format, or implement the same snapshot functionality. For example, a storage service may not implement a "preview" command with respect to snapshots.

Virtualization platforms, such as oVirt, available from ovirt.org, manage virtualized computing, virtual storage, and virtualized networks. Commands offered by some storage systems may not be offered by other storage systems, and, as discussed above, different storage systems implement snapshots in different ways. It would be desirable if a virtualization platform could interoperate with different external storage services, and yet offer to an operator a uniform and consistent mechanism for handling snapshots, irrespective of the internal manner in which a particular storage service implements snapshots.

The examples include mechanisms for interoperating with external storage services by maintaining an entity chain of information that facilitates the implementation of consistent commands across different storage services, and that keeps track of what storage entities are generated by a storage service in response to commands. In one example the entity chain identifies each storage entity of a volume. For each storage entity, the entity chain contains an entry that identifies the storage entity, indicates a relationship with another storage entity, if any, and identifies whether the storage entity is the active volume. Upon receipt of a command from an operator that utilizes the volume, such as deleting a disk with which the volume is associated, the entity chain for the referenced volume is accessed and implemented based on the storage entities identified in the entity chain.

Figure 2:
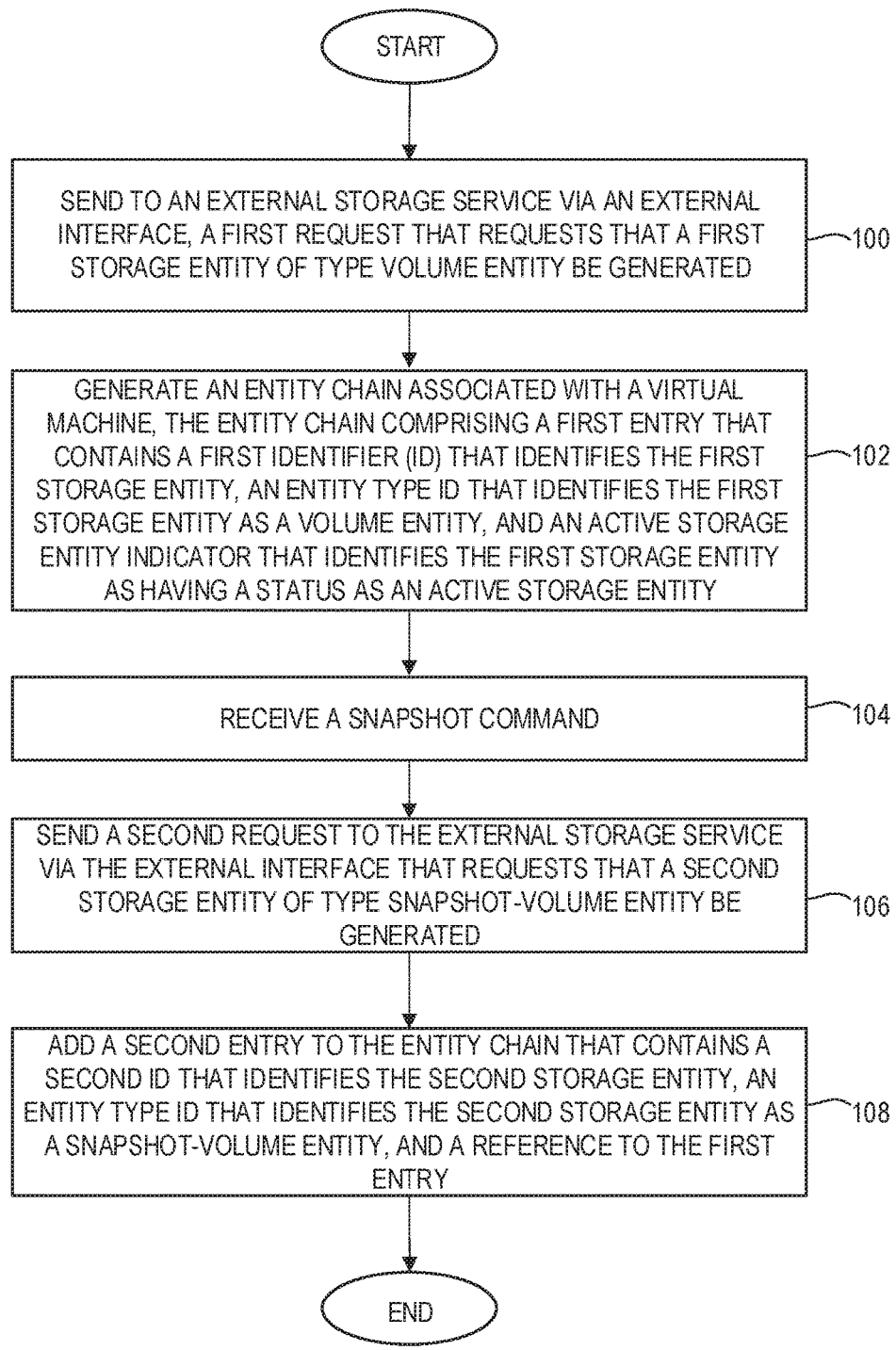
FIG. 2 is a flowchart of a method for generating an entity chain according to one example.

FIG. 1 is a block diagram of an environment 10 in which examples may be practiced. FIG. 2 is a flowchart of a method for generating an entity chain according to one example. FIG. 2 will be discussed in conjunction with FIG. 1. The environment 10 includes a computing device 12 that has a processor device 14 and a memory 15. The environment 10 also includes one or more external storage services 16-1 which may provide persistent storage for a virtual machine (VM) 24-1. The computing device 12 communicates with the external storage service 16-1 via an external interface 18. The external interface 18 may comprise any suitable interprocess communication technology, but in one example, comprises an application programming interface.

For purposes of illustration, assume that a volume 22 is to be generated for the VM 24-1. Referring now to FIG. 2, the computing device 12 sends to the external storage service 16-1 via the external interface 18 a first request 20 that requests that a first storage entity 26-1 of type volume entity be generated (block 100). The computing device 12 receives from the external storage service 16-1 a first identifier (ID) 32-1 that identifies the first storage entity 26-1 generated by the external storage service 16-1 in response to the request.

The computing device 12 then generates an entity chain 28 associated with the VM 24-1. The entity chain 28 includes a first entry 30-1 that contains the first ID 32-1 that identifies the first storage entity 26-1, an entity type ID 34-1 that identifies the first storage entity 26-1 as a volume entity, and an active storage entity indicator 36 that identifies the first storage entity 26-1 as having a status as an active storage entity (block 102). The active storage entity is the storage entity of a volume with which an associated VM will be coupled when initiated for purposes of storing persistent data. In this example, the first storage entity 26-1 is the only storage entity of the volume 22 and is thus the active storage entity for the VM 24. As will be discussed below, once snapshots are taken, which storage entity remains the active storage entity may differ depending on the particular external storage service 16-1.

The computing device 12 may now initiate the VM 24-1 to execute and couples the VM 24-1 to the first storage entity 26-1. Further assume that at a subsequent point in time the computing device 12 receives a first snapshot command 37 (block 104). The snapshot command 37, for example, requests that a snapshot be taken of a disk with which the volume 22 is associated. In particular, the snapshot command 37 requests that the state of the volume 22 be preserved at the moment of time that snapshot command 37 was entered, such that even if the VM 24-1 subsequently modifies the volume 22, the state of the volume 22 can be returned to the state of the volume 22 at the time of the snapshot command 37. As discussed above, different storage services implement snapshot capabilities in different ways.

In response to the snapshot command 37, the computing device 12 sends a second request 38 to the external storage service 16-1 via the external interface 18 that requests that a second storage entity 26-2 of type snapshot-volume entity be generated (block 106). The computing device 12 receives from the external storage service 16-1 a second ID 32-2 that identifies the second storage entity 26-2 generated by the external storage service 16-1 in response to the request. The computing device 12 adds a second entry 30-2 to the entity chain 28 that contains the second ID 32-2 that identifies the second storage entity 26-2, an entity type ID 34-2 that identifies the second storage entity 26-2 as a snapshot-volume entity, and a reference 40-1 to the first entry 30-1 (block 108). The reference 40-1 identifies the storage entity 26-1 as the "parent" of the storage entity 26-2. Note that the first entry 30-1 maintains the active storage entity indicator 36 because the external storage service 16-1 maintains snapshots in a manner such that the originally created storage entity, in this example, the first storage entity 26-1, remains the active storage entity even as additional snapshots are taken. Other external storage services 16-1, such as an external storage service 16-1 that uses a QEMU Copy On Write (Qcow), or Qcow2, file format, may make the most recently created snapshot the active volume. The examples disclosed herein use the entity chain 28 to keep track of the current active storage entity for a volume, irrespective of the underlying implementation of snapshots by a particular storage service 16-1.

Figure 3A:
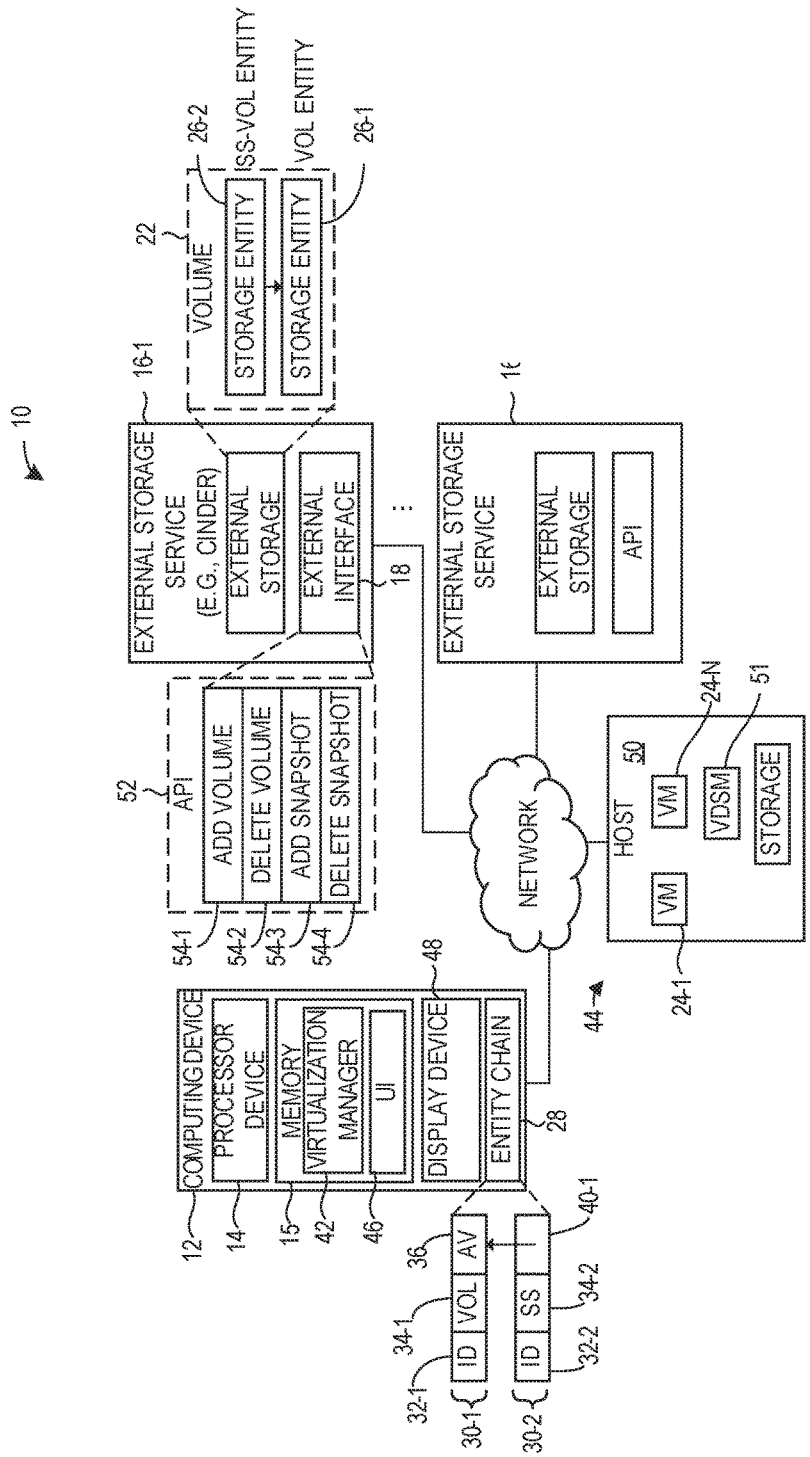
FIGS. 3A-3D are block diagrams of the environment illustrated in FIG. 1 in greater detail according to one example.

FIG. 3A is block diagram of the environment 10 in greater detail according to one example. In this example, a virtualization manager 42 manages aspects of a virtualized environment 44 and implements portions of the functionality discussed herein. Because the virtualization manager 42 is a component of the computing device 12, functionality implemented by the virtualization manager 42 may be attributed to the computing device 12 generally. Moreover, in examples where the virtualization manager 42 comprises software instructions that program the processor device 14 to carry out functionality discussed herein, functionality implemented by the virtualization manager 42 may be attributed herein to the processor device 14. The virtualization manager 42 may include a user interface 46 that can be presented on a display device 48 to interact with a user, such as an operator.

The environment 10 also includes the one or more external storage services 16-1-16-N which implement data storage that can be used by the virtualized environment 44. For example, the external storage services 16-1 may provide the persistent storage utilized by one or more VMs 24-1-24-N that are initiated on one or more hosts 50. While the examples can be implemented with any external storage services 16, solely for purposes of illustration the examples will be discussed in the context of the Cinder block storage service for OpenStack. The virtualization manager 42 may manage multiple storage services, including, for example, a Virtual Desktop and Server Manager (VDSM) storage service 51, which, in this example, may use a Qcow2 format to manage snapshots. While for purposes of illustration only a single entity chain 28 is illustrated in the memory 15, the virtualization manager 42 in practice may maintain an entity chain 28 for each volume used by a VM 24. Thus, the virtualization manager 42 may manage hundreds or thousands of entity chains 28. The manner in which the entries 30 of an entity chain 28 are managed may differ among the different external storage services 16-1-16-N, and VDSM storage service 51 depending on how such external storage services 16-1-16-N, and VDSM storage service 51 implement snapshots.

The virtualization manager 42 communicates with the external storage service 16-1 via an external interface 18. While the external interface 18 may comprise any interprocess communication technology or combination of technologies, in one example, the external interface 18 comprises an application programming interface (API) 52. The API 52 comprises a plurality of entry points 54-1-54-4 that can be invoked by the virtualization manager 42 to cause the external storage service 16-1 to implement requested actions, such as the creation of a volume entity, the deletion of a volume entity, the creation of a snapshot-volume entity, and the deletion of a snapshot-volume entity. It will be appreciated that only certain entry points 54 have been illustrated and that the external storage service 16-1 may offer any number of entry points 54.

As discussed above with regard to FIG. 1, assume that the virtualization manager 42 receives a request from an operator to generate a volume on the external storage service 16-1 for the virtual machine 24. In response, the virtualization manager 42 sends the first request 20 (FIG. 1) to the external storage service 16-1 to generate a storage entity of type volume entity. In this example, the first request 20 may comprise, for example, invoking the entry point 54-1. As discussed in greater detail above, in response to the first request 20, the external storage service 16-1 generates the first storage entity 26-1 and the virtualization manager 42 generates the entity chain 28 and the first entry 30-1.

The virtualization manager 42 may then receive a request to initiate the virtual machine 24 with a disk that utilizes the volume 22. The virtualization manager 42 accesses the entity chain 28, and determines, based on the entity chain 28, that the first storage entity 26-1 identified in the entity chain 28 has the status of being the active storage entity. The virtualization manager 42 then initiates the VM 24 with the first storage entity 26-1 such that the VM 24 writes data to the first storage entity 26-1.

The VM 24 may subsequently be terminated. Assume that the virtualization manager 42 then receives the snapshot command 37 (FIG. 1) from the operator. In response, the virtualization manager 42 sends a second request to the external storage service 16-1 via the external interface 18 that requests that a second storage entity 26-2 of type snapshot-volume entity be generated. For example, the virtualization manager 42 may invoke the entry point 54-3. The external storage service 16-1 then generates the second storage entity 26-2 having a type of snapshot-volume entity.

The virtualization manager 42 then adds to the entity chain 28 the second entry 30-2, as discussed above with regard to FIG. 1. Note that the first storage entity 26-1 remains the active storage entity because the external storage service 16-1 implements snapshots such that the original storage entity 26-1 remains the active volume even after snapshots have been taken.

The virtualization manager 42 may then receive a request to initiate the virtual machine 24 with a disk that utilizes the volume 22. The virtualization manager 42 accesses the entity chain 28, and determines, based on the entity chain 28, that the first storage entity 26-1 identified in the entity chain 28 has the status of being the active storage entity. The virtualization manager 42 then initiates the VM 24 with the first storage entity 26-1.

Figure 3B:
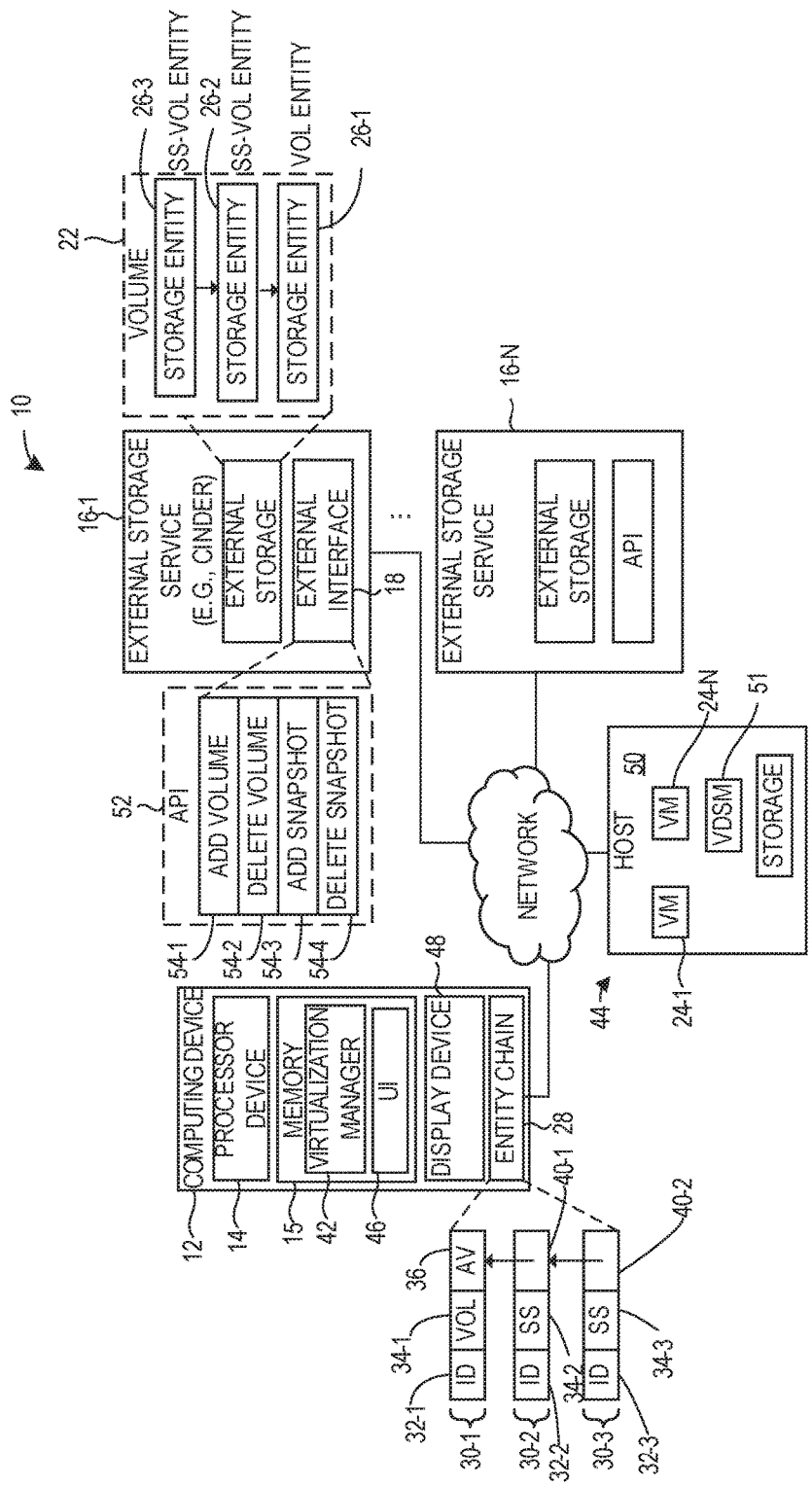

Assume that the virtualization manager 42 now receives a second snapshot command from the operator. Referring now to FIG. 3B, in response, the virtualization manager 42 sends another request to the external storage service 16-1 via the external interface 18 that requests that a third storage entity 26-3 of type snapshot-volume entity be generated. For example, the virtualization manager 42 may invoke the entry point 54-3. The external storage service 16-1 then generates the third storage entity 26-3 having a type of snapshot-volume entity.

The virtualization manager 42 adds a third entry 30-3 to the entity chain 28 that contains a third ID 32-3 that identifies the third storage entity 26-3, an entity type ID 34-3 that identifies the third storage entity 26-3 as a snapshot-volume entity, and a reference 40-2 to the second entry 30-2. Note that the storage entity 26-1 remains the active volume, as indicated by the entry 30-1.

Figure 3C:
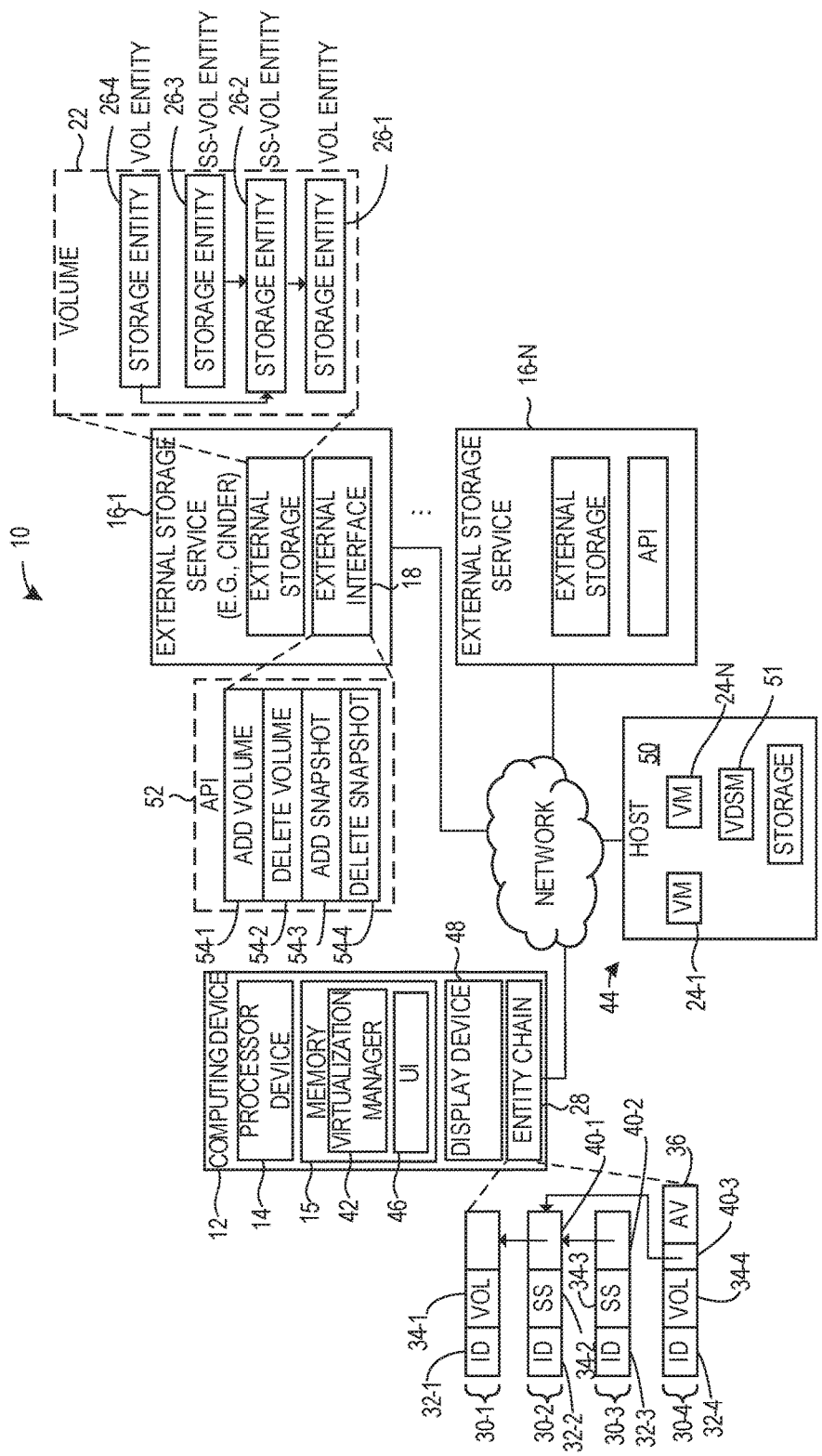

Referring now to FIG. 3C, assume that the virtualization manager 42 then receives a preview command associated with the second storage entity 26-2. A preview command is a command that indicates the VM 24 is to be initiated from a snapshot. In this example, the preview command identified the snapshot implemented by the second storage entity 26-2 as the snapshot to preview. In this example, the external storage service 16-1 does not offer preview functionality natively. To implement the preview functionality, the virtualization manager 42 accessed the entity chain 28 and obtains the second ID 32-2 that identifies the second storage entity 26-2 and sends a request to the external storage service 16-1 via the external interface 18 to generate a cloned volume based on the second storage entity 26-2. In response, the external storage service 16-1 generates a fourth storage entity 26-4 having a type of volume entity.

The virtualization manager 42 adds a fourth entry 30-4 to the entity chain 28 that contains a fourth ID 32-4 that identifies the fourth storage entity 26-4, an entity type ID that identifies the fourth storage entity 26-4 as a volume entity, a reference 40-3 to the second entry 30-2 because the preview was based on the second storage entity 26-2. In this example, because the implementation of the preview command resulted in a new volume type storage entity rather than a snapshot volume type storage entity, the virtualization manager 42 removes the active storage entity indicator 36 from the first entry 30-1 and adds the active storage entity indicator 36 to the fourth entry 30-4 to identify the fourth storage entity 26-4 as the active storage entity.

The virtualization manager 42 may then receive a request to initiate the VM 24 with a disk that utilizes the volume 22. The virtualization manager 42 accesses the entity chain 28, and determines, based on the entity chain 28, that the fourth storage entity 26-4 identified in the entity chain 28 has the status of being the active storage entity. The virtualization manager 42 then initiates the VM 24 with the fourth storage entity 26-4.

Figure 3D:
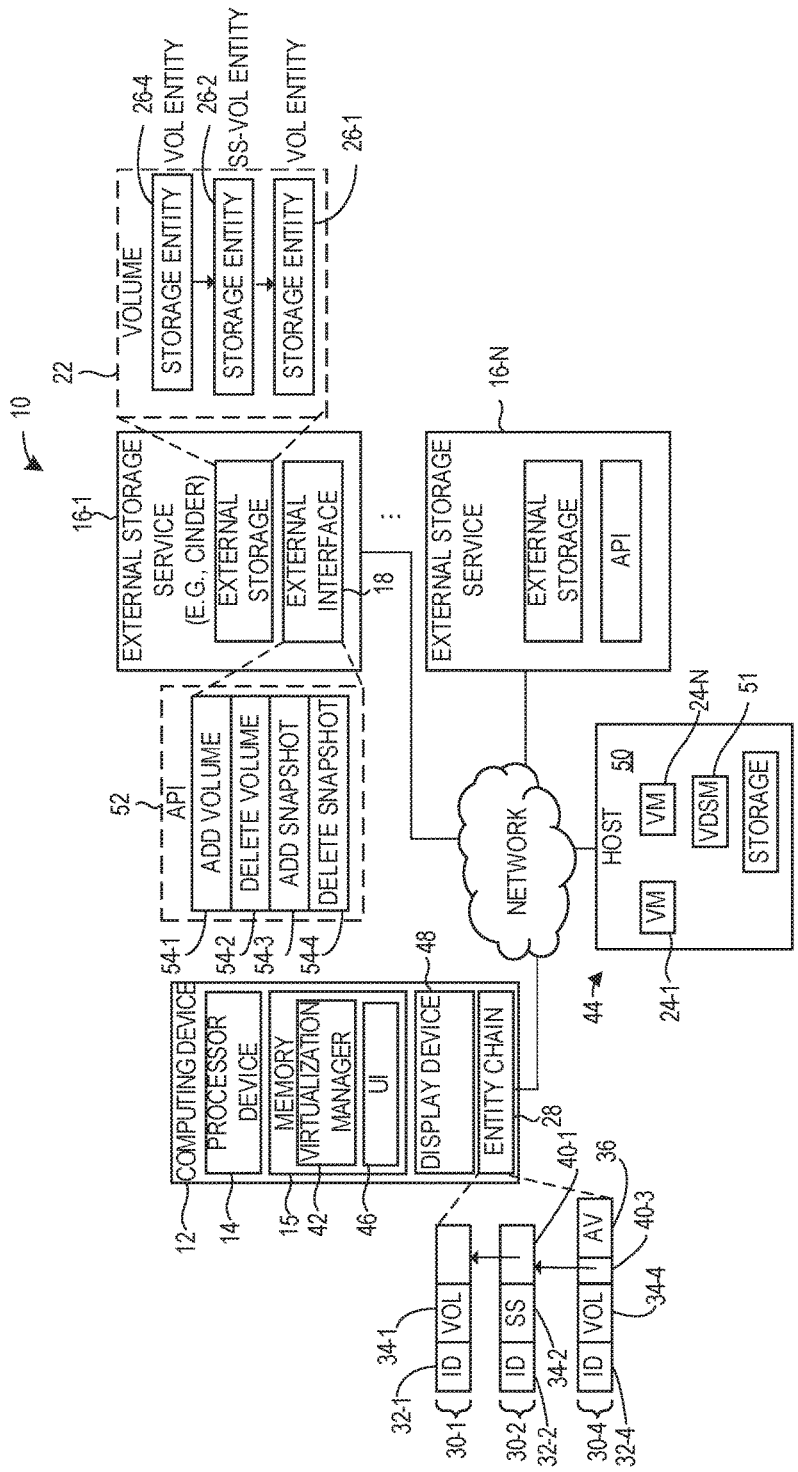

Referring now to FIG. 3D, the virtualization manager 42 may then receive a commit command. The commit command is a command to make the fourth storage entity 26-4, generated in response to the preview command, the new active storage entity going forward. Any snapshots made at a time later than the snapshot that was previewed are therefore no longer valid. Thus, upon receipt of the commit command, the virtualization manager 42 accesses the entity chain 28 and determines that the entry 30-4 which corresponds to the fourth storage entity 26-4, which was generated in response to the preview command, refers to the second entry 30-2, which corresponds to the second storage entity 26-2. The virtualization manager 42 also determines that the third storage entity 26-3 is a snapshot taken at a later time than the second storage entity 26-2. The virtualization manager 42 sends a request to the external storage service 16-1 to remove the third storage entity 26-3. The virtualization manager 42 removes the entry 30-3 from the entity chain 28 to reflect that the third storage entity 26-3 is gone. The virtualization manager 42 maintains the active storage entity indicator 36 with the fourth entry 30-4, so that a subsequent initiation of the VM 24-1 will utilize the fourth storage entity 26-4.

An undo command removes a storage entity created in response to the preview command. Thus, if, after the preview command, the virtualization manager 42 had received an undo command instead of a commit command, the virtualization manager would send a request to the external storage service 16-1 to remove the fourth storage entity 26-4, and would remove the entry 30-4 from the entity chain 28. The virtualization manager 42 would mark the entry 30-1 with the active storage entity indicator 36 so that the storage entity 26-1 would be the active volume.

The virtualization manager 42 may subsequently receive a request to delete a disk associated with the volume 22. The virtualization manager 42 accesses the entity chain 28, traverses the entity chain 28 to an entry 30 that has no other entries 30 dependent on it based on the references 40. In this example, the virtualization manager 42 determines this is the entry 30-4. The virtualization manager 42 obtains the fourth ID 32-4 that identifies the fourth storage entity 26-4 and sends a request to the external storage service 16-1 to remove the fourth storage entity 26-4. In this example, since the entry 30-4 identifies the fourth storage entity 26-4 as a volume entity, the virtualization manager 42 may invoke the entry point 54-2.

In one example, since the external storage service 16-1 is external and the underlying persistent storage is not directly accessible to the virtualization manager 42, the virtualization manager 42 monitors whether the external storage service 16-1 has complied with a request by periodically requesting the status of the fourth storage entity 26-4. In particular, after issuing a request, the virtualization manager 42 may periodically send a status request. If the status response from the external storage service 16-1 indicates that the fourth storage entity 26-4 no longer exists, the virtualization manager 42 removes the entry 30-4 from the entity chain 28 and moves to the next entry 30 referenced by the reference 40-2. In this case, that is the entry 30-2. The virtualization manager 42 obtains the second ID 32-2 that identifies the second storage entity 26-2 and sends a request to the external storage service 16-1 to remove the second storage entity 26-2. In this example, since the entry 30-2 identifies the second storage entity 26-2 as a snapshot-volume entity, the virtualization manager 42 may invoke the entry point 54-4.

If the operation is successful, the virtualization manager 42 removes the entry 30-2 from the entity chain 28 and moves to the next entry 30 referenced by the reference 40-1. In this case, that is the entry 30-1. The virtualization manager 42 obtains the second ID 32-1 that identifies the first storage entity 26-1 and sends a request to the external storage service 16-1 to remove the first storage entity 26-1. In this example, since the entry 30-1 identifies the first storage entity 26-1 as a volume entity, the virtualization manager 42 may invoke the entry point 54-1.

If the operation is successful, and no more entries 30 exist in the entity chain 28, the virtualization manager 42 marks the disk that was requested to be deleted as having been successfully deleted. The virtualization manager 42 may also present an indication on the display device 48 that the disk was successfully deleted.

If, after a period of status requests, the external storage service 16-1 did not indicate that the requested operation was successful, the virtualization manager 42 may mark the disk as invalid, and present an indication on the display device 48 that the disk was not successfully deleted.

Figure 4:
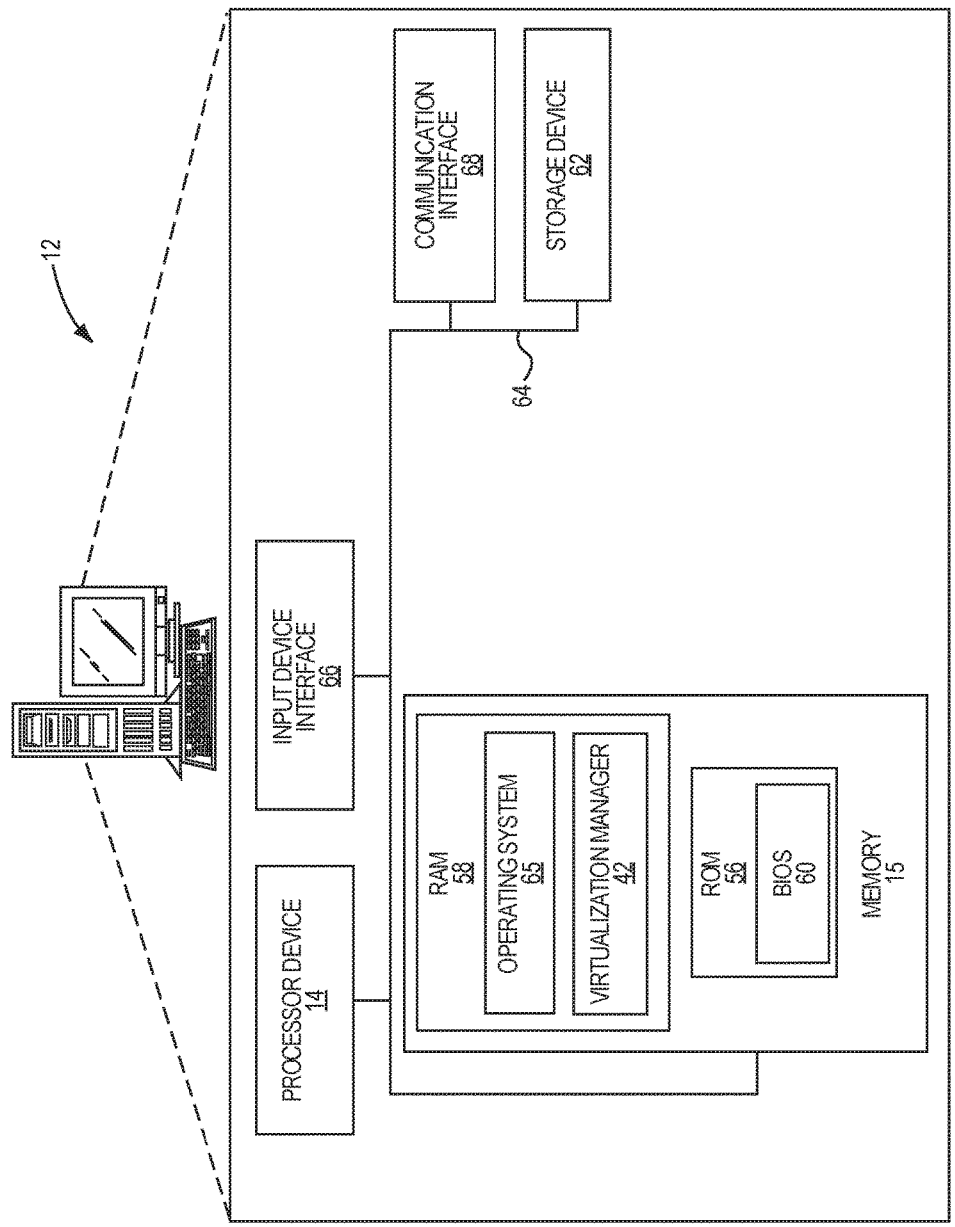
FIG. 4 is a block diagram of a computing device suitable for implementing examples according to one example.

FIG. 4 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 15, and a system bus 64. The system bus 64 provides an interface for system components including, but not limited to, the system memory 15 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 15 may include non-volatile memory 56 (e.g., read-only memory (ROM), erasable programmable read-only memory (EPROM), electrically erasable programmable read-only memory (EEPROM), etc.), and volatile memory 58 (e.g., random-access memory (RAM)). A basic input/output system (BIOS) 60 may be stored in the non-volatile memory 56 and can include the basic routines that help to transfer information between elements within the computing device 12. The volatile memory 58 may also include a high-speed RAM, such as static RAM, for caching data.

The computing device 12 may further include or be coupled to a non-transitory computer-readable storage medium such as the storage device 62, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 62 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 62 and in the volatile memory 58, including an operating system 65 and one or more processes, such as the virtualization manager 42, which may implement the functionality described herein in whole or in part. It is to be appreciated that the examples can be implemented with various commercially available operating systems 65 or combinations of operating systems 65.

A number of modules can be stored in the storage device 62 and in the volatile memory 58, including, by way of non-limiting example, the virtualization manager 42. All or a portion of the examples may be implemented as a computer program product stored on a transitory or non-transitory computer-usable or computer-readable storage medium, such as the storage device 62, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the virtualization manager 42 in the volatile memory 58, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface. Such input devices may be connected to the processor device 14 through an input device interface 66 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communication interface 68 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method for snapshot management of a volume comprising:

sending, by a computing device comprising a processor device, to an external storage service via an external interface, a first request that requests that a first storage entity of type volume entity be generated;

generating an entity chain associated with a virtual machine (VM), the entity chain comprising a first entry that contains a first identifier (ID) that identifies the first storage entity, an entity type ID that identifies the first storage entity as a volume entity, and an active storage entity indicator that identifies the first storage entity as having a status as an active storage entity;

receiving, by the computing device, a first snapshot command;

sending, by the computing device, a second request to the external storage service via the external interface that requests that a second storage entity of type snapshot-volume entity be generated;

adding a second entry to the entity chain that contains a second ID that identifies the second storage entity, an entity type ID that identifies the second storage entity as a snapshot-volume entity, and a reference to the first entry;

receiving, by the computing device, a second snapshot command;

sending, by the computing device, a third request to the external storage service via the external interface that requests that a third storage entity of type snapshot-volume entity be generated;

adding a third entry to the entity chain that contains a third ID that identifies the third storage entity, an entity type ID that identifies the third storage entity as a snapshot-volume entity, and a reference to the second entry;

receiving a preview command to preview the second storage entity;

in response to receiving the preview command, accessing the entity chain to obtain the second ID that identifies the second storage entity;

sending, by the computing device, a fourth request to the external storage service via the external interface that includes the second ID and requests that a cloned volume entity be generated from the second storage entity;

adding a fourth entry to the entity chain that contains a fourth ID that identifies a fourth storage entity, an entity type ID that identifies the fourth storage entity as a volume entity, a reference to the second entry, and the active storage entity indicator; and removing the active storage entity indicator from the first entry.

2. The method of claim 1 further comprising:
receiving a request to initiate the virtual machine with the disk that utilizes the volume;
accessing the entity chain;
determining, based on the entity chain, that the fourth storage entity identified in the entity chain has the status of the active storage entity; and
initiating the VM with the fourth storage entity.

3. The method of claim 2 further comprising:
receiving a commit command to commit the fourth storage entity;
in response to receiving the commit command, accessing the entity chain;
determining that the fourth storage entity refers to the second storage entity;
determining that the third storage entity refers to the second storage entity;
sending, by the computing device, a request to the external storage service via the external interface to remove the third storage entity;
removing the third entry from the entity chain; and
maintaining the active storage entity indicator on the fourth entry.

4. The method of claim 3 further comprising:
receiving a request to delete a disk associated with the volume;
accessing the entity chain;
traversing the entity chain to a last entry;
sending a request to the external storage service to remove the storage entity identified by the last entry; and
iteratively traversing the entity chain from the last entry to the first entry via the references contained in the respective entry, and for each entry sending a request to the external storage service to remove the storage entity identified by the respective entry.

5. The method of claim 4 further comprising:
subsequent to sending the request to the external storage service to remove the storage entity identified by the last entry, periodically sending a status request of the storage entity to the external storage service that requests a status of the storage entity;
receiving a status response to the status request that indicates the storage entity no longer exists; and
traversing the entity chain to a next entry in the entity chain.

6. The method of claim 4 further comprising:
subsequent to sending the request to the external storage service to remove the storage entity identified by the last entry, periodically sending a status request of the storage entity to the external storage service that requests a status of the storage entity;
determining, after a predetermined amount of time, that the storage entity has not been removed;
marking the disk as invalid; and
sending a message that the request to delete the disk failed.

7. A computing device comprising:
a memory;
a processor device coupled to the memory to:
send to an external storage service via an external interface, a first request that requests that a first storage entity of type volume entity be generated;
generate an entity chain associated with a virtual machine (VM), the entity chain comprising a first entry that contains a first identifier (ID) that identifies the first storage entity, an entity type ID that identifies the first storage entity as a volume entity, and an active storage entity indicator that identifies the first storage entity as having a status as an active storage entity;
receive a first snapshot command;
send a second request to the external storage service via the external interface that requests that a second storage entity of type snapshot-volume entity be generated;
add a second entry to the entity chain that contains a second ID that identifies the second storage entity, an entity type ID that identifies the second storage entity as a snapshot-volume entity, and a reference to the first entry;
receive a second snapshot command;
send a third request to the external storage service via the external interface that requests that a third storage entity of type snapshot-volume entity be generated;
add a third entry to the entity chain that contains a third ID that identifies the third storage entity, an entity type ID that identifies the third storage entity as a snapshot-volume entity, and a reference to the second entry;
receive a preview command to preview the second storage entity;
in response to receiving the preview command, access the entity chain to obtain the second ID that identifies the second storage entity;
send a fourth request to the external storage service via the external interface that includes the second ID and requests that a cloned volume entity be generated from the second storage entity;
add a fourth entry to the entity chain that contains a fourth ID that identifies a fourth storage entity, an entity type ID that identifies the fourth storage entity as a volume entity, a reference to the second entry, and the active storage entity indicator; and
remove the active storage entity indicator from the first entry.

8. The computing device of claim 7 wherein the processor device is further to:
receive a commit command to commit the fourth storage entity;
in response to receiving the commit command, access the entity chain;
determine that the fourth storage entity refers to the second storage entity; determine that the third storage entity refers to the second storage entity;
send a request to the external storage service via the external interface to remove the third storage entity;
remove the third entry from the entity chain; and
maintain the active storage entity indicator on the fourth entry.

9. A computer program product for snapshot management of a volume, the computer program product stored on a non-transitory computer-readable storage medium and including instructions configured to cause a processor device to:
send to an external storage service via an external interface, a first request that requests that a first storage entity of type volume entity be generated;
generate an entity chain associated with a virtual machine (VM), the entity chain comprising a first entry that contains a first identifier (ID) that identifies the first storage entity, an entity type ID that identifies the first storage entity as a volume entity, and an active storage entity indicator that identifies the first storage entity as having a status as an active storage entity;

receive a first snapshot command;

send a second request to the external storage service via the external interface that requests that a second storage entity of type snapshot-volume entity be generated;

add a second entry to the entity chain that contains a second ID that identifies the second storage entity, an entity type ID that identifies the second storage entity as a snapshot-volume entity, and a reference to the first entry;

receive a second snapshot command;

send a third request to the external storage service via the external interface that requests that a third storage entity of type snapshot-volume entity be generated;

add a third entry to the entity chain that contains a third ID that identifies the third storage entity, an entity type ID that identifies the third storage entity as a snapshot-volume entity, and a reference to the second entry;

receive a preview command to preview the second storage entity;

in response to receiving the preview command, access the entity chain to obtain the second ID that identifies the second storage entity;

send a fourth request to the external storage service via the external interface that includes the second ID and requests that a cloned volume entity be generated from the second storage entity;

add a fourth entry to the entity chain that contains a fourth ID that identifies a fourth storage entity, an entity type ID that identifies the fourth storage entity as the volume entity, a reference to the second entry, and the active storage entity indicator; and remove the active storage entity indicator from the first entry.

10. The computer program product of claim 9 wherein the instructions further cause the processor device to:

receive a commit command to commit the fourth storage entity;

in response to receiving the commit command, access the entity chain;

determine that the fourth storage entity refers to the second storage entity; determine that the third storage entity refers to the second storage entity;

send a request to the external storage service via the external interface to remove the third storage entity;

remove the third entry from the entity chain; and maintain the active storage entity indicator on the fourth entry.

11. A method for snapshot management of a volume comprising:

sending, by a computing device comprising a processor device, to an external storage service via an external interface, a first request that requests that a first storage entity of type volume entity be generated;

generating an entity chain associated with a virtual machine (VM), the entity chain comprising a first entry that contains a first identifier (ID) that identifies the first storage entity, an entity type ID that identifies the first storage entity as a volume entity, and an active storage entity indicator that identifies the first storage entity as having a status as an active storage entity;

receiving, by the computing device, a first snapshot command;

sending, by the computing device, a second request to the external storage service via the external interface that requests that a second storage entity of type snapshot-volume entity be generated;

adding a second entry to the entity chain that contains a second ID that identifies the second storage entity, an entity type ID that identifies the second storage entity as a snapshot-volume entity, and a reference to the first entry;

receiving a preview command to preview the second storage entity;

in response to receiving the preview command, accessing the entity chain to obtain the second ID that identifies the second storage entity;

sending, by the computing device, a third request to the external storage service via the external interface that includes the second ID and requests that a cloned volume entity be generated from the second storage entity;

adding a third entry to the entity chain that contains a third ID that identifies a third storage entity, an entity type ID that identifies the third storage entity as a volume entity, a reference to the second entry, and the active storage entity indicator; and removing the active storage entity indicator from the first entry.

* * * * *